United States Patent
Luschi et al.

(10) Patent No.: US 8,934,520 B2
(45) Date of Patent: *Jan. 13, 2015

(54) RADIO RECEIVER IN A WIRELESS COMMUNICATION SYSTEM

(75) Inventors: Carlo Luschi, Oxford (GB); Abdelkader Medles, Bristol (GB); Gang Wang, Bristol (GB)

(73) Assignee: Icera Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/575,598

(22) PCT Filed: Jan. 27, 2011

(86) PCT No.: PCT/EP2011/051151
§ 371 (c)(1),
(2), (4) Date: Jul. 26, 2012

(87) PCT Pub. No.: WO2011/092249
PCT Pub. Date: Aug. 4, 2011

(65) Prior Publication Data
US 2013/0051448 A1 Feb. 28, 2013

(30) Foreign Application Priority Data
Jan. 28, 2010 (GB) .................................. 1001389.4

(51) Int. Cl.
*H04B 1/711* (2011.01)
*H04L 25/02* (2006.01)
(Continued)

(52) U.S. Cl.
CPC ............ *H04B 1/711* (2013.01); *H04L 25/0202* (2013.01); *H04B 1/7117* (2013.01); *H04B 2201/7071* (2013.01); *H04L 25/03006* (2013.01)
USPC ........... 375/148; 375/147; 375/140; 375/349; 375/346; 375/316; 455/226.1; 455/130; 455/67.13; 455/67.11; 455/39

(58) Field of Classification Search
CPC .. H04B 17/009; H04B 1/7117; H04B 1/7113; H04B 1/7103; H04B 1/7105; H04B 1/711; H04L 25/02; H04L 25/03006
USPC ......... 375/148, 316, 147, 140, 130, 349, 346; 455/226.1, 130, 67.13, 67.11, 39
See application file for complete search history.

(56) References Cited

U.S. PATENT DOCUMENTS 6,252,915 B1  6/2001  Mollenkopf et al.
6,333,953 B1 * 12/2001 Bottomley et al. ........... 375/316
(Continued)

FOREIGN PATENT DOCUMENTS

EP    1359674 A1    10/2002
EP    2012439 A2    5/2008
(Continued)

OTHER PUBLICATIONS

Abou-Khousa, M.; Ghrayeb, A.; El-Tarhuni, M., "On multipath detection in CDMA systems," Communications, 2005. ICC 2005. 2005 IEEE International Conference on , vol. 3, No., pp. 2097,2101 vol. 3, May 16-20, 2005.*

(Continued)

*Primary Examiner* — Chieh M Fan
*Assistant Examiner* — Michelle M Koeth

(57) ABSTRACT

A method, receiver and program for processing radio signals to identity an n-ray channel condition. The method comprises: receiving signal samples and estimating a plurality of channel taps from the samples; estimating for each of the channel taps a signal power and a disturbance power; filtering the signal power to provide a filtered signal power quantity; filtering the disturbance power to provide a filtered disturbance power quantity; using the filtered power quantities to determine n strongest channel taps; generating first and second comparison parameters using the strongest channel taps and at least one other channel tap; providing a comparison result based on the first and second comparison parameters and a threshold value, and; identifying an n-ray channel condition from the comparison result.

20 Claims, 3 Drawing Sheets

(51) Int. Cl.
  *H04B 1/7113* (2011.01)
  *H04B 1/7115* (2011.01)
  *H04B 1/10* (2006.01)
  *H04B 1/7117* (2011.01)
  *H04L 25/03* (2006.01)

(56) References Cited

U.S. PATENT DOCUMENTS

| | | | |
|---|---|---|---|
| 6,901,243 | B2 | 5/2005 | Jayaraman et al. |
| 7,020,073 | B2 | 3/2006 | Kadous et al. |
| 7,224,714 | B1 | 5/2007 | Barman et al. |
| 7,317,747 | B2 | 1/2008 | Miyazaki et al. |
| 7,397,844 | B2 | 7/2008 | Smee et al. |
| 7,646,802 | B2 | 1/2010 | Black et al. |
| 7,746,970 | B2 | 6/2010 | Mergen et al. |
| 7,796,680 | B2 | 9/2010 | Matsumoto et al. |
| 8,189,653 | B2 | 5/2012 | Luschi et al. |
| 2003/0087622 | A1 | 5/2003 | Jayaraman et al. |
| 2003/0095508 | A1 | 5/2003 | Kadous et al. |
| 2004/0165650 | A1 | 8/2004 | Miyazaki et al. |
| 2006/0120438 | A1* | 6/2006 | Reial ............... 375/148 |
| 2007/0054692 | A1 | 3/2007 | Nie et al. |
| 2007/0076791 | A1 | 4/2007 | DiFazio et al. |
| 2007/0110201 | A1 | 5/2007 | Mergen et al. |
| 2008/0016381 | A1 | 1/2008 | Fitton et al. |
| 2008/0075147 | A1 | 3/2008 | Grossman et al. |
| 2008/0159373 | A1 | 7/2008 | Taha et al. |
| 2009/0110036 | A1* | 4/2009 | Luschi et al. ............ 375/148 |
| 2009/0110048 | A1 | 4/2009 | Luschi et al. |
| 2009/0110049 | A1 | 4/2009 | Luschi et al. |
| 2009/0111413 | A1 | 4/2009 | Luschi et al. |
| 2009/0124204 | A1 | 5/2009 | Howard et al. |
| 2009/0268786 | A1 | 10/2009 | Matsumoto et al. |
| 2009/0274196 | A1 | 11/2009 | Black et al. |
| 2010/0296553 | A1 | 11/2010 | Luschi et al. |
| 2011/0019754 | A1 | 1/2011 | Andrews et al. |
| 2011/0032837 | A1 | 2/2011 | Luschi et al. |
| 2011/0058597 | A1 | 3/2011 | Huckett et al. |
| 2011/0200075 | A1 | 8/2011 | Clevorn et al. |
| 2012/0087406 | A1 | 4/2012 | Lim et al. |

FOREIGN PATENT DOCUMENTS

| | | |
|---|---|---|
| WO | 9904537 A1 | 1/1999 |
| WO | 0223742 A2 | 3/2002 |
| WO | 2007107805 A1 | 9/2007 |
| WO | 2009056500 A2 | 5/2009 |
| WO | 2011092249 A1 | 8/2011 |

OTHER PUBLICATIONS

Proakis, J. G. "Digital Communications," Second Edition, McGraw-Hill Book Company, International Editions 1989, 10 pages.

Dumais, P., et al., "On the Implementation of a Multi-Equalizer," IEEE, 2005, 4 pages, Montreal, Canada.

Hardouin, E., et al., "Environment-Adaptive Receivers: A Performance Predicition Approach," IEEE ICC, 2006, pp. 5709-5714, cedix 9, France.

Hooli, K., et al., "Performance Evaluation of Adaptive Chip-Level Channel Equalizers in WCDMA Downlink," 2001 IEEE, pp. 1974-1979.

Klein, A., "Data detection algorithms specially designed for the downlink of CDMA mobile radio systems," IEEE Vehicular Technology Conference, Vo. 1, May 1997, pp. 203-207.

GB application No. 0721425.7, entitled "Processing Digital Samples in a Wireless Receiver," filed Oct. 31, 2007, 34 pages.

GB application No. 1001389.4, entitled "A Radio Receiver in a Wireless Communication System," filed Jan. 28, 2010, 23 pages.

* cited by examiner

RADIO RECEIVER IN A WIRELESS COMMUNICATION SYSTEM

CROSS-REFERENCE TO RELATED APPLICATION

This application is the National Stage of, and therefore claims the benefit of, International Application No. PCT/EP2011/051151 filed on Jan. 27, 2011, entitled "A RADIO RECEIVER IN A WIRELESS COMMUNICATION SYSTEM," which was published in English under International Publication Number WO 2011/092249 A1 on Aug. 4, 2011, and has a priority date of Jan. 28, 2010, based on GB Application No. 1001389.4. Both of the above applications are commonly assigned with this National Stage application and are incorporated herein by reference in their entirety.

TECHNICAL FIELD

The present invention relates to a radio receiver in a wireless communication system and to a method of processing radio signals.

BACKGROUND

The transmission of radio signals carrying data in modern wireless communications can be realized based on a number of different communications systems, often specified by a standard. There are increasing requirements for devices which are able to operate to support more than one of these wireless communications systems. Mobile radio receiver devices include analog radio frequency (RF)/intermediate frequency (IF) stages, which are arranged to receive and transmit wireless signals via one or more antennas. The output of the RF/IF stages is typically converted to baseband, where an Analog-to-Digital Converter (ADC) converts incoming analog signals to digital samples, which are then processed for signal detection and decoding of the data in the form of logical values. The ADC may alternatively operate directly at IF, in which case the conversion to baseband is performed in the digital domain. A number of different types of front end processing of the digital samples are known to implement signal detection, including rake receiver processing and channel equalization processing.

In Code Division Multiple Access (CDMA) wireless systems, different physical channels are multiplexed in the code domain using separate spreading sequences.

In the case of orthogonal spreading codewords, the original data symbols can then be effectively separated at the receiver by despreading.

In a Wideband CDMA (WCDMA) cellular system, downlink code multiplexing is performed using Orthogonal Variable Spreading Factor (OVSF) codes. However, the OVSF codewords are orthogonal to each other only under the condition of perfect time alignment. In the presence of multipath propagation, the code orthogonality is lost, and the operation of despreading is affected by Multiple Access Interference (MAI).

CDMA mobile radio receivers conventionally employ a rake processor which relies on the correlation properties of the spreading sequences. A rake processor is described for example in J. G. Proakis, "Digital Communication", New York, McGraw-Hill, 1995. This type of receiver is subject to performance degradation in the presence of code correlation, if the MAI between code-multiplexed transmission is comparable to the other sources of noise and interference. Under these conditions, a performance advantage may be achieved by attempting to restore the orthogonality between the codes before despreading. The sub-optimality of conventional 3GPP receivers based on rake processing causes a significant performance penalty, especially for downlink data rates increasing from the 384 kbps for WCDMA Release 99 to High Speed Downlink Packet Access (HDSPA) rates of several Mbps. When the code orthogonality is destroyed by multipath, an effective approach is to use channel equalization instead of rake processing.

For example, a Minimum Mean-Square Error (MMSE) chip-level linear equalizer has been shown to provide a significant performance advantage over conventional rake reception, at the cost of an increased implementation complexity. This advantage is especially important for high rate data transmission, as in 3GPP high speed downlink packet access HSDPA. However, channel equalization may not be able to provide superior performance in all possible scenarios. In particular, the use of a channel equalizer does not provide an advantage under single-ray propagation conditions, i.e., in the absence of multipath propagation.

The above limitations generally depend on the particular equalization algorithm under consideration. In the case of a linear MMSE equalizer, in the presence of a non-frequency selective or flat channel response, the equalizer processing still relies on the estimation of the channel impulse response, with a channel estimation error proportional to the number of the channel impulse response samples. In this situation, the use of a rake receiver not only does not correspond to a performance loss caused by MAI, but in fact reduces to a minimum the channel estimation error, relying on the estimate of a single channel tap.

Similarly, in the case of a Least-Squares (LS) equalizer, the receiver performance may be penalized by using the estimation of the channel statistics performed with a dimensionality higher than required in the specific conditions of non dispersive channel, i.e., of channel propagation profile with a single tap.

International Application Publication No. WO 2009/056500 describes a receiver structure capable of selecting the use of rake receiver or equalizer. A number of bases of selection are discussed including identification of the receiver operation under low delay spread channel conditions. In particular, the receiver adaptation can rely on the estimation of the channel root-mean square (rms) delay spread, or on a measure of the channel energy outside a predefined time window. The inventors have determined that a main limitation of these schemes is the difficulty of distinguishing between a single-ray channel profile and a channel profile with low delay spread that may however still benefit from the use of channel equalization. For instance, in the case of a HSDPA receiver, the inventors have demonstrated by internal simulation results and performance tests that the use of a chip level equalizer can still provide a significant performance advantage with respect to the rake receiver for channel profiles with very low delay spread, like, e.g., the Pedestrian A (PA) channel profile of the 3GPP standard.

It is an object of this invention to identify n-ray propagation conditions, which is capable of resolving the above issue.

SUMMARY

According to an aspect of the present invention, there is provided a method of processing radio signals in a wireless radio receiver to identify an n-ray channel condition comprising:

receiving signal samples and estimating a plurality of channel taps from the samples;

estimating for each of the channel taps a signal power and a disturbance power;

filtering the signal power to provide a filtered signal power quantity;

filtering the disturbance power to provide a filtered disturbance power quantity;

using the filtered power quantities to determine n strongest channel taps;

generating first and second comparison parameters using the n strongest channel taps and at least one other channel tap;

providing a comparison result based on the first and second comparison parameters and a threshold value, and;

identifying an n-ray channel condition from the comparison result.

Another aspect of the invention provides a radio receiver for a wireless communication system comprising:

means for receiving signal samples and estimating a plurality of channel taps from the samples;

means for estimating for each of the channel taps a signal power and a disturbance power;

means for filtering the signal power to provide a filtered signal power quantity;

means for filtering the disturbance power to provide a filter disturbance power quantity;

means for using the filtered power quantities to determine n strongest channel taps;

means for generating first and second comparison parameters using the n strongest channel taps and at least one other channel tap;

means for providing a comparison result based on the first and second comparison parameters and a threshold value; and means for identifying an n-ray channel condition from the comparison result.

A further aspect of the invention provides a computer program product which implements the method defined above when executed on a processor.

A further aspect of the invention provides a radio receiver for a wireless communication system comprising:

a wireless interface for receiving digital samples;

a processor arranged to execute a program which implements the steps of the above defined method;

a memory holding a rake processing code sequence and an equalization processing code sequence; the processor adapted to execute one of the rake processing and equalization processing sequence in dependence on the identified n-ray channel condition.

The following described embodiments relate to the implementation of an algorithm where n=1 for the identification of single ray channel conditions in a wireless receiver, based on the estimation of the received signal power and noise plus interference power. The method and receiver are particularly useful when applied to the selection of appropriate receiver parameters and signal processing algorithms in a 3GPP wideband code division multiple access (WCDMA)/high speed downlink packet access (HSDPA) receiver. In that case, the invention is particularly beneficial when applied to the selection between rake receiver processing and equalization processing in a receiver.

The invention is generally applicable to any communication system where there is a need to detect transmission conditions over a non-frequency selective channel. The invention is particularly but not exclusively concerned with the identification of single ray propagation conditions in a high speed wireless receiver.

It will be understood that disturbance power refers to noise (such as additive Gaussian White Noise) and interference (such as from other signals).

BRIEF DESCRIPTION OF THE DRAWINGS

For a better understanding of the present invention and to show how the same may be carried into effect, reference will now be made by way of example to the accompanying drawings in which.

DETAILED DESCRIPTION

Figure 1:
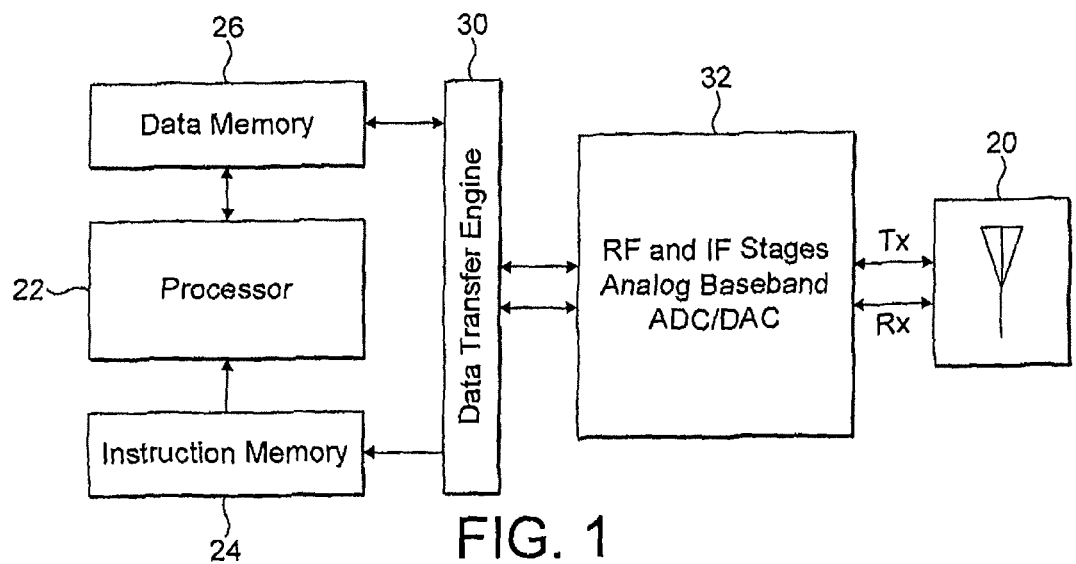
FIG. 1 is a schematic block diagram of a wireless communications device.

FIG. 1 is a schematic block diagram of a device, such as that embodied in a mobile terminal, for transmitting and receiving signals in a wireless communications system. Such a device can be implemented in a number of different ways, but in accordance with FIG. 1 a series of RF/IF stages 32 is arranged to receive and transmit wireless signals (TX, RX) via one or more antennas 20. The embodiments of the present invention discussed herein are principally concerned with receiving wireless signals, so that transmit signals will not be mentioned further. The received signal at the output of the RF/IF stages is typically converted to baseband, where an ADC converts the analog signal into digital samples. The block 32 of FIG. 1 includes components for processing the received radio signals and providing digital signal samples r(k). This can be achieved in different ways, which are known in the art and which are not discussed further herein.

The samples r(k) are supplied to a data transfer engine 30 which communicates with a processor 22, an instruction memory 24 and a data memory 26. The processor 22 is responsible for processing the samples r(k). The processor 22 can execute a number of different functions which are held in an instruction memory 24 in the form of code sequences. This provides a so-called soft modem which has a number of advantages discussed further herein.

Figure 2:
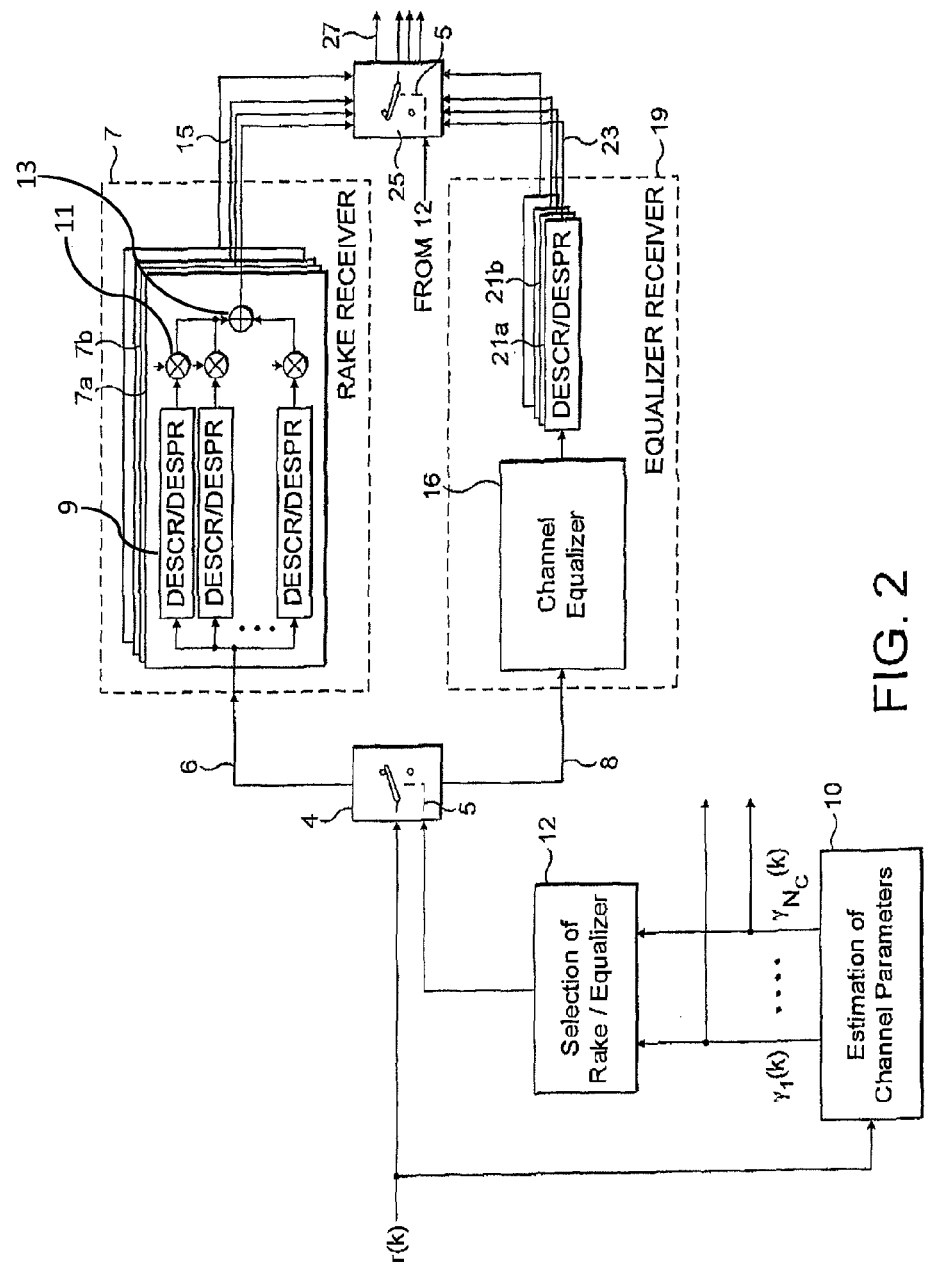
FIG. 2 is a block diagram showing selection between rake receiver processing and equalizer processing.

FIG. 2 is a schematic block diagram which illustrates a number of different functions that are executed by the processor 22. A first function denoted by block 10 is referred to as estimation of channel parameters. This function estimates a number of different parameters related to the communication channels over which the radio signals are transmitted in the wireless communication system. The function 10 provides at time k the outputs $\gamma_n(k)$, n=1, . . . , $N_C$, where $N_C$ denotes the number of estimated channel parameters, that represent a set of channel parameters derived from the received signal samples r(k). The estimated channel parameters $\gamma_n(k)$ can be used for a number of different purposes. As illustrated in FIG. 2, they are supplied to a Selection of Rake/Equalizer Receiver function 12 which determines whether to process the received samples using a rake receiver or an equalizer receiver. The rake receiver or equalizer receiver is implemented by the processor 22 executing the appropriate code sequence from the instruction memory 24.

The use of the estimated channel parameters to control the selection of a rake receiver or equalizer receiver (function 12) will now be discussed in more detail. FIG. 2 illustrates a hardware version of the concept in schematic form. The digital samples r(k) are supplied to a switch 4 which has an input 5 receiving the command signal for the selection of rake receiver or equalizer processing from the function 12.

In accordance with this signal, the switch 4 selects a processing path 6 via a rake receiver 7, or a processing path 8 via an equalizer 9. As is known in the art, the rake receiver includes a set of rake fingers 7a, 7b, for each channel transmitted on a separate channelization code. Each finger is associated with a single descrambler/despreader 19 and a weighting function 11, and the set of fingers relative to each channel are associated to an adder 13 providing a processed output on output path 15. As the operation of a rake receiver is well understood to a person skilled in the art, its function will not further be described here.

The equalizer receiver 19 comprises a chip level equalizer 16 and a plurality of descramblers/despreaders 21a, 21b, for each channel transmitted on a separate channelization code. The outputs of the descramblers/despreaders are supplied along output path 23. An output switch 25 provides processed outputs on lines 27 to subsequent decoding functions. The switch 25 is (like the switch 4) controlled by control input 5 which receives the command signal for the selection of rake receiver or equalizer from the function 12.

While FIG. 2 illustrates a hardware concept of processing function selection, the same functionalities may be implemented based on the software architecture of FIG. 1. In this case, it will readily be appreciated that in the embodiment of the invention illustrated in FIG. 1 it is not possible to identify different physical paths (6, 8, 15, 23). Instead, selection of a rake receiver or equalizer function is made by downloading different code sequences dependent on whether a rake receiver function or equalizer receiver function is to be executed by the processor 22.

In such a software implementation of the receiver, where only either rake or equalizer processing is performed at any given time, the above approach also provides an overall reduction of computational complexity with respect to a conventional receiver implementing a channel equalizer in hardware. In this respect conventional modems based on a hardware implementation are forced to the choice between a design dictated by the maximum data rate requirements and the instantiation of multiple algorithms as separate areas of silicon. These solutions imply higher implementation costs, size and/or power consumption and any compromise would inevitably penalize performance. On the other hand, the proposed solution allows to reduce complexity, size and cost by reusing a common platform to adaptively select the optimum set of signal processing functions capable of maximising performance and minimise power consumption.

Figure 3:
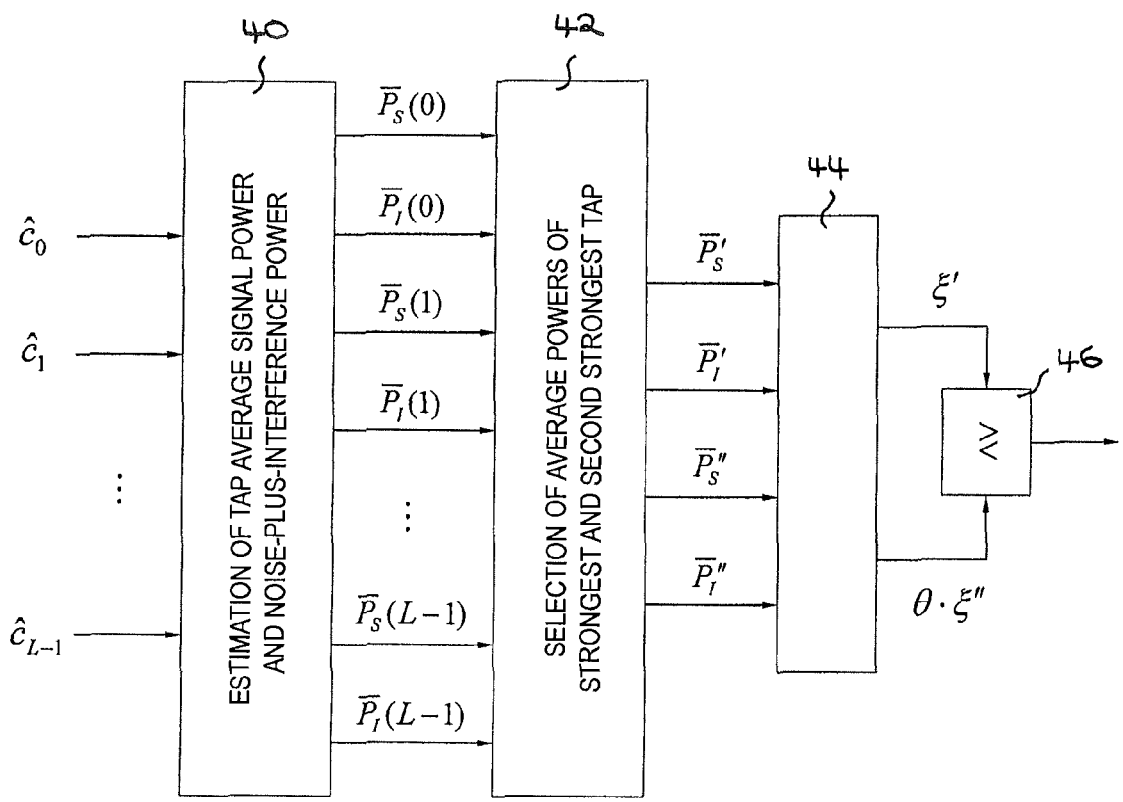
FIG. 3 is a schematic block diagram of single ray detection.

Reference will now be made to FIG. 3 to describe a single ray detection technique which is implemented in the selection of rake or equalizer function 12 and the estimation of channel parameters function 10.

Consider a wireless communication channel with overall time varying impulse response $h(t, \tau) = g_T(\tau) \otimes c(t, \tau) \otimes g_R(\tau)$, where '$\otimes$' denotes the convolution operator, $g_T(t)$ and $g_R(t)$ indicate the impulse response of the transmit and receive filters, and $$c(t,\tau) = \sum_{l=0}^{L-1} c_l(t) \delta(\tau - \tau_l) \quad (1)$$

represents the impulse response at time t of the propagation channel, modelled as a tapped delay line with delay index $\tau$. In terms of the various channel propagation paths, $c(t, \tau)$ is the sum of the complex gains of all the paths with delay $\tau$, measured at the current location of the receiver antenna.

Denote by $\hat{c}_l$, $l=0, \ldots, L-1$ the channel taps estimated at the receiver. In the case of a rake receiver, the estimated taps $\hat{c}_l$ may correspond to the tracked (and possibly combined) rake receiver fingers.

The single ray detection technique described herein is based on the use of long term averages of the signal power and noise-plus interference power corresponding to each estimated channel tap, according to the following procedure:

Estimate the signal power $P_S(l)$ and the noise-plus-interference power $P_I(l)$ for each of the channel taps $\hat{c}_l$, $l=0, \ldots, L-1$.

Filter the quantities $P_S(l)$ and $P_I(l)$ enough to average over the fast channel variations due to fading, to obtain the filtered quantities $\overline{P}_S(l)$ and $\overline{P}_I(l)$ for each of the channel taps $\hat{c}_l$, $l=0, \ldots, L-1$. In FIG. 3, the estimating and filtering steps are carried out in block 40. In one embodiment, the memory of the filter is in the order of a few hundreds of radio frames (where one WCDMA/HSPA radio frame has duration of 10 ms).

Find the strongest and the second strongest channel taps (fingers) based on the ratio between $\overline{P}_S(l)$ and $\overline{P}_I(l)$ for all channel taps $\hat{c}_l$, $l=0, \ldots, L-1$ (or based on the value of $\overline{P}_S(l)$ for all channel taps $\hat{c}_l$, $l=0, \ldots, L-1$). Let $\overline{P}'_S$ and $\overline{P}'_I$ denote the filtered signal power and noise-plus-interference power for the strongest tap, and $\overline{P}''_S$ and $\overline{P}''_I$ the filtered signal power and noise-plus-interference power for the second strongest tap. This step is shown in block 42.

Generate in block 44 generates comparison parameters, based on the above power values $\overline{P}'_S$, $\overline{P}'_I$, $\overline{P}''_S$, and $\overline{P}''_I$. This can be carried out in a number of different ways.

In a first embodiment of the present invention:
Compute the quantities $\xi' = \overline{P}'_S / \overline{P}'_I$ and $\xi'' = \overline{P}''_S / \overline{P}''_I$.

In a second embodiment of the invention:
Filter the quantities $\overline{P}'_S / \overline{P}'_I$, and $\overline{P}''_S / \overline{P}''_I$, and denote by $\xi'$ and $\xi''$ the respective filtered power ratios.

In a third embodiment of the invention:
Filter the quantities $\overline{P}'_S \cdot \overline{P}''_I$ and $\overline{P}''_S \cdot \overline{P}'_I$, and denote $\xi'$ by $\xi''$ and the respective filtered quantities.

Finally, the comparison block 46 generates an object which controls the selection of rate receiver or equalizer. If $\xi' > \theta \cdot \xi''$ (or equivalently if $\xi'/\xi'' > \theta$), the receiver is determined to be operating under single-ray propagation conditions, i.e., that the channel propagation profile includes a single tap; otherwise, it is determined that the channel profile includes more than a single tap.

For each of the above embodiments, the threshold $\theta$ is optimized from simulation of the quantities $\xi'$ and $\xi''$ for the cases of single-ray and non single-ray propagation profiles.

The optimization of $\theta$ could also be based on the performance of the receiver processing algorithms to which the single-ray detection is applied. In this case, it is more appropriate to talk of effective single-ray conditions, defined as the conditions for which the receiver processing algorithm designed for single-ray channel (for example, rake processing in the case of a WCDMA/HSDPA receiver) outperforms the algorithm designed for non-single ray channel (for example, equalizer processing in the case of a WCDMA/HSDPA receiver).

In an alternative implementation, the signal and noise-plus interference power of the second strongest tap may be replaced by the combined power derived from all the remaining measured channel taps $\hat{c}_l$ other than the strongest channel tap.

The proposed approach can be further generalized to detect other channel conditions. For example, the proposed procedure can be straightforwardly modified for the detection of n rays channel condition by computing the quantities $\overline{P}'_S$ and $\overline{P}'_I$ as the filtered combined signal power and noise-plus-interference power of the n strongest taps, with $\overline{P}''_S$ and $\overline{P}''_I$ corresponding to the filtered combined signal power and sum noise-plus-interference power of the remaining channel taps.

For example, this strategy can be employed as an alternative to the measure of the energy outside a given temporal window, to estimate the length of the channel impulse response.

The above described embodiments allow identification of single-ray channel conditions based on the comparison between the estimated signal and noise-plus-interference power of the strongest channel tap and the second strongest channel tap (or of the strongest channel tap and all other channel taps).

The above described embodiments allow discrimination with respect to very short delay spread channels by relying to long term averages—by using filters with long enough memory to average over the channel variations due to fast fading.

The rake/equalizer selection is made based on the long term channel statistics, instead of the instantaneous channel taps. In fact, if a channel coefficient is present although temporarily attenuated, its power may increase rapidly enough to make it difficult for the selection process to react in time to switch to the appropriate receiver algorithm. By relying on the long term statistics, in the presence of multipath it is implicitly chosen to have in place a receiver algorithm capable of coping with a multipath channel. The instantaneous realizations of the channel do not always reflect the long term statistics, therefore any decision criterion needs to be based on an average of the channel realisation over a sufficiently long window of time.

In the above embodiment, the filter memory is referred to the 10 ms WCDMA radio frame. However, another relationship which is important is with the channel coherence time (which is defined as the time interval after which the channel realizations become uncorrelated):

$T_c=1/2f_D$, where $f_D=f_0 v/c$ is the maximum Doppler frequency.

For instance, at a carrier frequency $f_0$ of 2 GHz and a mobile speed v of 3 km/h, a few hundred frames corresponds to a few tens of times the channel coherence time. In preferred embodiments, the filter memory is in the order of or greater than 10 times the channel coherence time and/or at least an order of magnitude greater than the frame.

The method described above for the identification of single-ray propagation conditions allows to select the appropriate receiver signal processing for the specific conditions of non-frequency selective channel, corresponding to a propagation profile containing a single tap. More specifically, it allows the possibility of switching between a receiver signal processing implementation designed to counteract the effect of multipath distortion, based, e.g., on a chip level equalizer for WCDMA/HSDPA, and a receiver signal processing implementation optimized for flat fading channel conditions, based, e.g., on a rake receiver for WCDMA/HSDPA.

For a WCDMA/HSDPA receiver, the selection of rake receiver processing in the presence of single-ray propagation has the following advantages:
  Provides the possibility of reducing the receiver complexity and power consumption, especially in the case of a software receiver implementation.
  Provides the possibility of achieving the best receiver performance under both frequency selective and flat channel conditions, in the presence of a limitation of the equalizer performance due to channel estimation errors.

The invention claimed is:

1. A method of processing radio signals in a wireless radio receiver to identify an n-ray channel condition comprising:
   receiving signal samples and estimating a plurality of channel taps from the samples;
   estimating for each of the channel taps a signal power and a disturbance power;
   filtering the signal powers to provide filtered signal power quantities;
   filtering the disturbance powers to provide filtered disturbance power quantities;
   using the filtered signal power quantities and the filtered disturbance power quantities to determine n strongest channel taps;
   generating first and second comparison parameters using the n strongest channel taps and at least one other channel tap, wherein the step of generating the first comparison parameter includes determining a ratio of the filtered signal power quantity and the filtered disturbance power quantity for the n strongest channel taps;
   providing a comparison result based on the first and second comparison parameters and a threshold value, and;
   identifying an n-ray channel condition from the comparison result.

2. A method according to claim 1, wherein n=1 and the step of identifying an n-ray channel condition comprises identifying a single ray channel condition.

3. A method according to claim 1, wherein the step of identifying an n-ray channel condition is used to select one of a rake processing and equalization processing.

4. A method according to claim 1, wherein the step of generating the second comparison parameter comprises determining a ratio of the filtered signal power quantity and the filtered disturbance power quantity for the at least one other channel tap.

5. A method according to claim 4, wherein the ratios are filtered to generate the respective first and second comparison parameters.

6. A method according to claim 1, wherein the step of generating the first and second comparison parameters comprises filtering a multiplicand of the filtered signal power quantity for the strongest channel tap and the filtered disturbance power quantity for the at least one other channel tap as the first comparison parameter, and filtering a multiplicand of the filtered signal power quantity for the at least one other channel tap and the filtered disturbance power quantity for the strongest channel tap as the second comparison parameter.

7. A method according to claim 1, wherein the at least one other channel tap is the second strongest channel tap.

8. A method according to claim 1, wherein the at least one other channel tap comprises all channel taps apart from the n strongest taps.

9. A radio receiver for a wireless communication system comprising:
   means for receiving signal samples and estimating a plurality of channel taps from the samples;
   means for estimating for each of the channel taps a signal power and a disturbance power;
   means for filtering the signal powers to provide filtered signal power quantities;
   means for filtering the disturbance powers to provide filter disturbance power quantities;
   means for using the filtered signal power quantities and the filtered disturbance power quantities to determine n strongest channel taps; and
   means for generating first and second comparison parameters using the n strongest channel taps and at least one other channel tap, wherein the means for generating the first comparison parameter includes means for filtering a multiplicand of the filtered signal power quantity for the strongest channel tap and the filtered disturbance power quantity for the at least one other channel tap as the first comparison parameter;

means for providing a comparison result based on the first and second comparison parameters and a threshold value; and means for identifying an n-ray channel condition from the comparison result.

10. A receiver according to claim 9, wherein the n-ray channel condition is the single ray channel condition.

11. A receiver according to claim 9, which comprises a rake processing function and an equalization processing function and additionally comprises means for selecting one of the rake processing function and equalization processing function based on the output from the identifying means.

12. A computer program product comprising program code stored on a non-transitory computer readable medium which when executed by a processor implements a method of processing radio signals in a wireless radio receiver, said method comprising:

receiving signal samples and estimating a plurality of channel taps from the samples;

estimating for each of the channel taps a signal power and a disturbance power;

filtering the signal powers to provide filtered signal power quantities;

filtering the disturbance powers to provide filtered disturbance power quantities;

using the filtered signal power quantities and the filtered disturbance power quantities to determine n strongest channel taps;

generating first and second comparison parameters using then strongest channel taps and at least one other channel tap, wherein the step of generating the first comparison parameter includes filtering a multiplicand of the filtered signal power quantity for the strongest channel tap and the filtered disturbance power quantity for the at least one other channel tap as the first comparison parameter;

providing a comparison result based on the first and second comparison parameters and a threshold value, and;

identifying an n-ray channel condition from the comparison result.

13. A radio receiver for a wireless communication system comprising:

a wireless interface for receiving digital samples;

a processor arranged to execute a program which implements the method of claim 1;

a memory holding a rake processing code sequence and an equalization processing code sequence; the processor configured to execute one of the rake processing and equalization processing sequence in dependence on an identified n-ray channel condition.

14. A radio receiver according to claim 9 embodied on a mobile terminal.

15. A computer program product according to claim 12, wherein n=1 and the step of identifying an n-ray channel condition comprises identifying a single ray channel condition.

16. A computer program product according to claim 15, wherein the step of identifying an n-ray channel condition is used to select one of a rake processing and equalization processing.

17. A computer program product according to claim 12, wherein the step of generating the first comparison parameter comprises determining the ratio of the filtered signal power quantity and the filtered disturbance power quantity for the n strongest channel taps, and the second comparison parameter, the ratio of the filtered signal power quantity and the filter disturbance power quantity for the at least one other channel tap.

18. A computer program product according to claim 17, wherein the ratios are filtered to generate the respective first and second comparison parameters.

19. A computer program product according to claim 16 wherein the step of generating the second comparison parameter comprises filtering a multiplicand of the filtered signal power quantity for the at least one other channel tap and the filtered disturbance power quantity for the strongest channel tap as the second comparison parameter.

20. A computer program product according to claim 12, wherein the at least one other channel tap comprises all channel taps apart from the n strongest taps.

* * * * *